(12) United States Patent
Mehta et al.

(10) Patent No.: US 10,436,275 B2
(45) Date of Patent: Oct. 8, 2019

(54) GAS STRUT

(71) Applicant: GM Global Technology Operations LLC, Detroit, MI (US)

(72) Inventors: Himanshu H. Mehta, Ann Arbor, MI (US); Jacob Duvall, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 165 days.

(21) Appl. No.: 15/444,860

(22) Filed: Feb. 28, 2017

(65) Prior Publication Data

US 2018/0245659 A1    Aug. 30, 2018

(51) Int. Cl.
| | |
|---|---|
| B62D 25/00 | (2006.01) |
| F16F 9/32 | (2006.01) |
| E05F 15/53 | (2015.01) |
| B60J 5/10 | (2006.01) |
| E05F 3/02 | (2006.01) |
| F16F 9/02 | (2006.01) |

(52) U.S. Cl.
CPC ............... *F16F 9/3264* (2013.01); *B60J 5/10* (2013.01); *E05F 3/02* (2013.01); *E05F 15/53* (2015.01); *F16F 9/0218* (2013.01); *F16F 9/0281* (2013.01); *E05Y 2201/212* (2013.01); *E05Y 2900/546* (2013.01); *F16F 2222/126* (2013.01); *F16F 2230/0047* (2013.01); *F16F 2230/16* (2013.01); *F16F 2230/24* (2013.01); *F16F 2230/30* (2013.01); *F16F 2232/08* (2013.01)

(58) Field of Classification Search
CPC ...... F16F 9/3264; F16F 9/0281; F16F 9/0218; F16F 2230/0047; F16F 2230/16; F16F 2230/24; F16F 2230/30; F16F 2232/08; E05F 3/02; E05F 15/53; B60J 5/10; E05Y 2900/546; E05Y 2201/212
USPC ........................................................... 296/56
See application file for complete search history.

(56) References Cited

U.S. PATENT DOCUMENTS

| | | | | |
|---|---|---|---|---|
| 4,230,309 A | * | 10/1980 | Schnitzius | ............ F16F 9/0209 16/66 |
| 4,427,231 A | * | 1/1984 | Smith | ........................ B65F 3/28 222/166 |
| 4,538,951 A | * | 9/1985 | Yeazel | ...................... B65F 3/00 280/124.177 |

(Continued)

FOREIGN PATENT DOCUMENTS

CN        2704719 Y        6/2005

OTHER PUBLICATIONS

Office Action issued in Chinese counter-part Application No. 201810151521.5; dated Apr. 24, 2019 (pp. 1-6).

*Primary Examiner* — Jerry E Redman
(74) *Attorney, Agent, or Firm* — Cantor Colburn LLP

(57) ABSTRACT

A gas strut includes a housing, a piston assembly, a dye, and a dye containment seal. The housing includes an inner surface defining a chamber extending along a centerline. The chamber includes a working portion and a dye storage portion disposed axially adjacent to the working portion. The piston assembly is constructed and arranged to reciprocate within the working portion, and the dye is located in the dye storage portion. The dye containment seal is disposed in the dye storage portion, and is constructed and arranged to transfigure from a normal state to a dye release state thereby releasing the dye upon the piston assembly.

19 Claims, 2 Drawing Sheets

(56) References Cited

U.S. PATENT DOCUMENTS

| | | | | |
|---|---|---|---|---|
| 5,851,049 | A | * | 12/1998 | Squire .................... E05F 15/49 296/146.4 |
| 5,921,604 | A | * | 7/1999 | Yu ...................... F15B 15/1476 296/146.4 |
| 8,226,146 | B2 | * | 7/2012 | Duffy ................ B62D 33/0273 16/82 |
| 9,982,737 | B2 | | 5/2018 | Beltran et al. |
| 2016/0290428 | A1 | * | 10/2016 | Beltran .................. F16F 7/087 |
| 2017/0218188 | A1 | * | 8/2017 | Kozawa ............. B60R 13/0243 |

* cited by examiner

GAS STRUT

INTRODUCTION

The subject disclosure relates to gas struts, and more particularly to gas strut wear indicators.

Gas struts are known to include a piston assembly that reciprocates within a pressure chamber defined by a housing. Typically, the pressure chamber contains an inert gas such as nitrogen. The piston assembly includes an enlarged head that slides within the housing, and a rod that extends from the head and out through one end of the housing. In operation, as the rod retracts within the housing, the total volume of the pressure chamber is reduced thus increasing the gas pressure within the chamber. The piston head may include valves or openings that communicate axially through the piston head to control and establish pressure equilibrium on both sides of the piston head regardless of the axial location of the head during a strut cycle. Because the surface area on a leading side of the piston head is larger than a surface area of the other side (i.e., the side that the rod attaches to), axial forces may not be equivalent. Therefore, as pressure increases within the pressure chamber as the strut retracts, a force that resists the retraction increases tending to bias the strut toward a fully extended position.

Regardless of gas strut position, the positive gas pressure within the gas strut is maintained or preserved via a seal that sealably slides against the reciprocating piston rod. As the seal wears, or through other components that may wear or require maintenance over time, the gas pressure in the pressure chamber may decrease with increasing wear on the seal. For example, a twenty percent decrease in gas pressure may be significant in some applications, and if the degraded pressure condition is known, may lead to strut maintenance or replacement. Unfortunately, known means to determine degraded gas pressure conditions is limited and/or impractical.

Accordingly, a robust wear indicator for gas struts is desirable.

SUMMARY

In one exemplary, non-limiting, embodiment of the present disclosure, a gas strut includes a housing, a piston assembly, a dye, and a dye containment seal. The housing includes an inner surface defining a chamber extending along a centerline. The chamber includes a working portion and a dye storage portion disposed axially adjacent to the working portion. The piston assembly is constructed and arranged to reciprocate within the working portion, and the dye is located in the dye storage portion. The dye containment seal is disposed in the dye storage portion, and is constructed and arranged to transfigure from a normal state to a dye release state thereby releasing the dye upon the piston assembly.

In addition to the foregoing embodiment, the inner surface defines a recess disposed radially outward from and in fluid communication with the working portion when the dye containment seal is in the normal state, the dye containment seal axially disposed adjacent to the working portion, the dye containment seal being in sealing contact with the inner surface, the transfigure of the dye containment seal being an axial translation from the normal state to the dye release state upon loss of internal pressure in the chamber, the recess being in fluid communication between the working portion and the dye storage portion when the seal is in the dye release state for the flow of the dye into the working portion.

In the alternative or additionally thereto, in the foregoing embodiment, the piston assembly includes a rod and a head engaged to the rod, and the dye deposits upon the rod when the dye containment seal is in the dye release state.

In the alternative or additionally thereto, in the foregoing embodiment, the housing includes a base end and an opposite working end through which the rod extends, and the dye storage portion is located at the base end.

In the alternative or additionally thereto, in the foregoing embodiment, the recess is a circumferentially continuous groove.

In the alternative or additionally thereto, in the foregoing embodiment, the recess is one of a plurality of recesses and each recess is spaced circumferentially from an adjacent recess.

In the alternative or additionally thereto, in the foregoing embodiment, the piston assembly is constructed and arranged to reciprocate in the chamber and between a retracted position with the rod being axially retracted within the housing and an extended position with the rod being axially extended out of the housing.

In the alternative or additionally thereto, in the foregoing embodiment, the base end is disposed above the working end when the gas strut is in at least one of the retracted and extended positions.

In the alternative or additionally thereto, in the foregoing embodiment, the dye is in liquid form.

In the alternative or additionally thereto, in the foregoing embodiment, the dye is fluorescent.

In the alternative or additionally thereto, in the foregoing embodiment, the gas strut includes a spring disposed in the dye storage area, and constructed and arranged to exert an axial force upon the seal.

In the alternative or additionally thereto, in the foregoing embodiment, the inner surface is cylindrical and the seal is disc-shaped.

In the alternative or additionally thereto, in the foregoing embodiment, at least one opening communicates axially through the head for the flow of a pressurized gas as the piston assembly reciprocates, and for the flow of the dye when the seal is in the dye release state.

In the alternative or additionally thereto, in the foregoing embodiment, the gas strut is one of a gas damper, a gas spring, and a shock absorber.

In the alternative or additionally thereto, in the foregoing embodiment, the piston assembly includes a rod and a head engaged to the rod, and the dye containment seal is in sealing contact with the rod.

In the alternative or additionally thereto, in the foregoing embodiment, the dye containment seal is a vessel for containing the dye when in the normal state, and is constructed and arranged to wear upon the rod and release the dye when in the dye release state.

A vehicle gas strut assembly according to another, non-limiting, embodiment includes a frame, a liftgate, and a gas strut. The gas strut includes a housing, a piston assembly, a dye, and a dye containment seal. The housing defines a chamber and is pivotally engaged to one of the frame and the liftgate. The piston assembly is constructed and arranged to reciprocate within the chamber and pivotally engages to the other of the frame and the liftgate. The dye is disposed in the chamber, and the dye containment seal is constructed and arranged to transfigure from a normal state to a dye release state indicative of strut wear.

Additionally to the foregoing embodiment, the chamber is a pressure chamber and includes a working portion through which the piston assembly reciprocates, a dye containment portion, and a recess, and wherein the recess is in fluid communication with the working portion when the dye containment seal is in a normal state and is in fluid communication with and between the working and dye containment portions when the dye containment seal is in a dye release state.

In the alternative or additionally thereto, in the foregoing embodiment, the dye containment seal is a vessel that contains the dye and includes a wall biased against a rod of the piston assembly, and wherein the wall is constructed and arranged to wear-through after a pre-determined number of piston cycles thereby releasing the dye.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
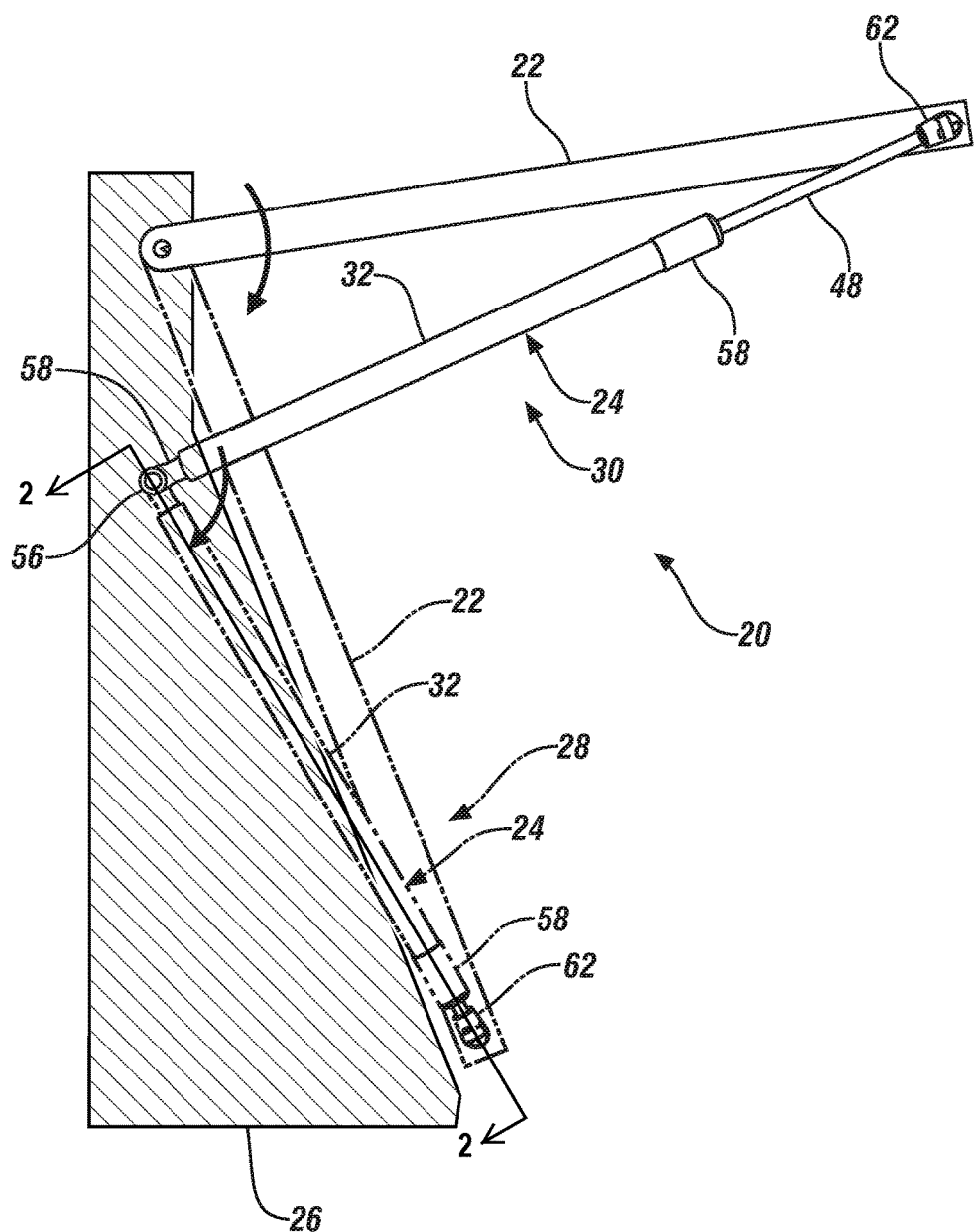
FIG. 1 is a schematic of a gas strut assembly utilized with a vehicle liftgate.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates a gas strut assembly 20 that may be applied to a vehicle, and more specifically, to a vehicle liftgate 22. In this example, a gas strut 24 of the gas strut assembly 20 may extend between and may be pivotally engaged to the liftgate 22 and a vehicle frame 26. The gas strut 24 facilitates the lifting, and thus opening, of the liftgate 22 as the gas strut 24 pivotally moves from a retracted position 28 (i.e., illustrated in ghost) to an extended position 30. In this and/or other applications, the gas strut 24 may be a gas spring, a gas damper, a shock absorber, and other similar embodiments.

Figures 2, 3, 4:
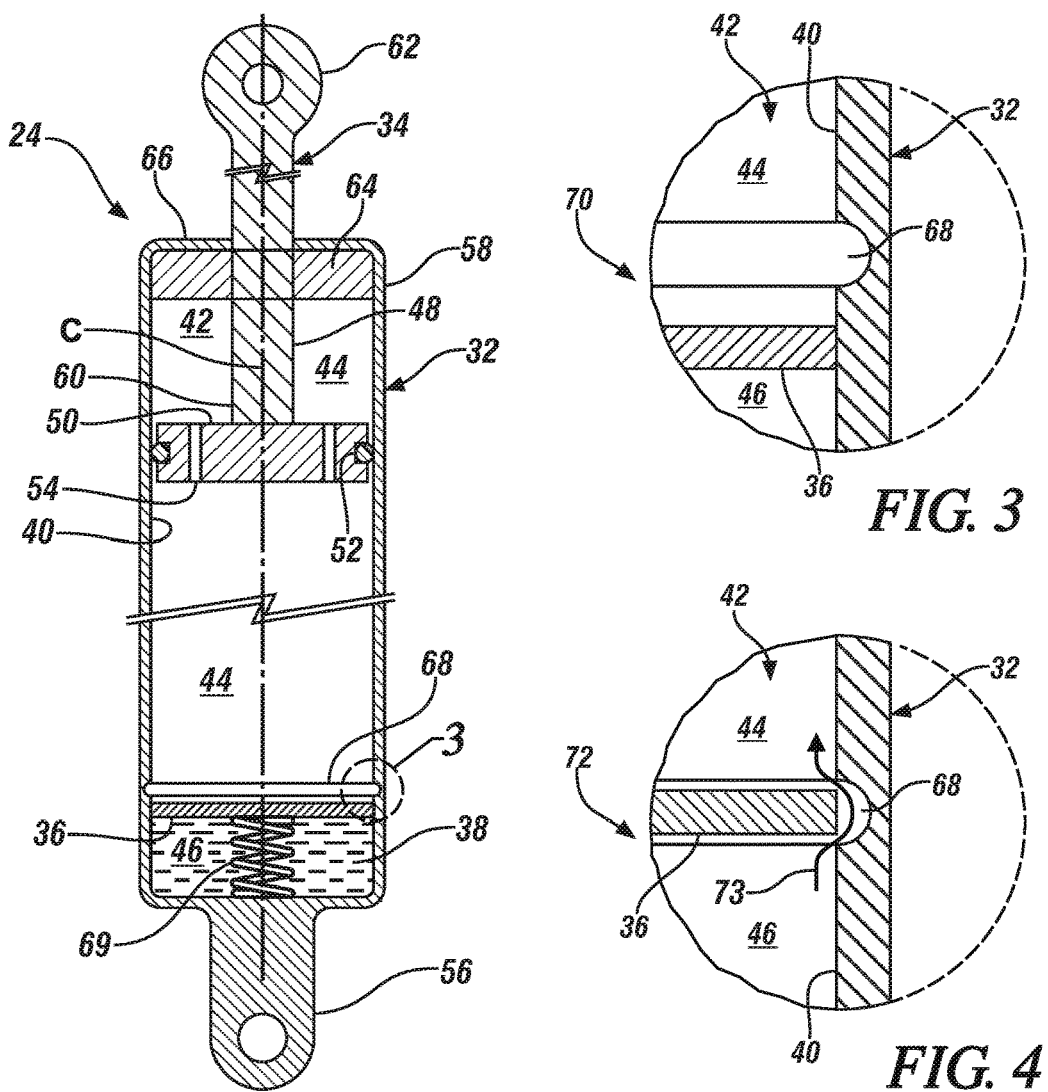
FIG. 2 is a cross section of a gas strut of the gas strut assembly of FIG. 1 taken along the line 2-2.
FIG. 3 is a partial, enlarged, cross section of the gas strut illustrating a dye containment seal of the gas strut in a normal state, and taken from circle 3 of FIG. 2.
FIG. 4. is a partial cross section of the gas strut illustrating the dye containment seal in a dye release state.

Referring to FIG. 2, the gas strut 24 may include a housing 32 that may be a cylinder, a piston assembly 34, a dye containment seal 36, and a dye 38. The piston assembly 34 reciprocates along a centerline C within the housing 32. The housing 32 includes an inner surface 40 that faces radially inward and may be cylindrical. The inner surface 40 defines, in-part, a chamber 42 that includes a working portion 44 and a dye containment portion 46 axially located adjacent to the working portion 44. The dye containment seal 36 may be generally located in the dye containment portion 46 and axially adjacent to the working portion 44. In one embodiment, the chamber 42 may be a pressure chamber, and opposite sides of the dye containment seal 36 may axially, and respectively, define the working and dye containment portions 44, 46 of the pressure chamber 42.

The piston assembly 34 includes a rod 48 (also see FIG. 1) and a head 50 that may be radially enlarged with respect to the rod 48. The head 50 is adapted to reciprocate along an axial length of the working portion 44 of the chamber 42. The head 50 may include a seal 52 that may be an o-ring, and at least one opening or valve 54 that axially communicates through the head 50. In operation, the seal 52 sealably slides upon the inner surface 40 of the housing 32, and a gas that may be pressurized, controllably flows through the openings 54 from one side of the piston head 50 to the other as the piston assembly 34 reciprocates. Sizing of the opening 54 (or configuration of a valve) affects the dampening ability of the gas strut 24 as is typically known by one skilled in the art.

Referring to FIGS. 1 and 2, the housing 32 may further include a base end 56 that may be pivotally engaged to the vehicle frame 26, and an opposite working end 58 through which the rod 48 of the piston assembly 34 extends. The rod 48 may include a first end 60 attached to the piston head 50 and an opposite second end 62 pivotally engaged to the liftgate 22. The gas strut 24 may further include a rod seal 64 capable of maintaining a positive gas pressure of the gas (e.g., nitrogen) in the chamber 42, while sealably sliding against the rod 48 as the piston assembly 34 reciprocates between the retracted and extended positions 28, 30 (see FIG. 1). The rod seal 64 may be disposed in the chamber 42 proximate to the working end 58 of the housing 32. An annular flange 66 of the housing 32 may project radially inward from the inner surface 40. The rod seal 64 may be axially adjacent to the flange 66. It is contemplated and understood that pivotal engagement of the end 62 of the piston rod 48 and the end 56 of the housing 32 may be reversed with the rod end 62 engaged to the vehicle frame 26 and the housing end 56 engaged to the liftgate 22. Moreover, it is contemplated that the flange 66 may be, or may be part of, a dust boot typically known to one having skill in the art.

Referring to FIGS. 2 through 4, the inner surface 40 of the housing 32 may further define a recess 68 located radially outward from, and in fluid communication with, the working portion 44 of the chamber 42 during normal operation of the gas strut 24. The dye containment seal 36 may be axially located between the recess 68 and the base end 56 of the housing 32 (see FIG. 3). In one embodiment, the dye containment seal 36 may be disc-shaped, and may sealably slide against the inner surface 40 of the housing 32 in response to a differential pressure across the seal 36. The gas strut 24 may further include a biasing member or spring 69 that may be a coiled spring. The spring 69 may be located in the dye containment portion 46 of the chamber 42, and facilitates the exertion of an axial force that may bias the dye containment seal 36 toward the working portion 44 of the chamber 42 and toward the recess 68. As illustrated, the recess 68 may be a circumferentially continuous groove. It is contemplated and understood; however, that the recess 68 may be circumferentially discontinuous, may be a plurality of circumferentially spaced recesses, and/or may be one or a series of relatively short channels that extend axially.

In operation and as the rod seal 64 wears over time, the gas pressure within the working portion 44 of the chamber 42 may become less than the pressure within the dye containment portion 46. Once the force created by the differential pressure across the seal 36 becomes greater than an a opposing frictional force created by the sealing interface between the inner surface 40 of the housing 32 and the dye containment seal 36, the seal may axially translate from a normal state 70 (see FIG. 3), toward the recess 68, and into a dye release state 72 (see FIG. 4). When the dye containment seal 36 axially reaches the recess 68 and is in the dye release state 72, the recess 68 is in fluid communication with both the working portion 44 and the dye containment portion 46 of the chamber 42 facilitating the release of the dye 38 from the dye containment portion 46 and into the working portion 44 (i.e. see arrow 73 indicating the direction of dye travel in FIG. 3).

With the dye 38 released into the working portion 44, the dye may flow through the piston head openings 54 and upon the piston rod 48. As the piston rod moves from the retracted position 28 and into the extended position 30, the dye 38 is deposited upon the rod 48 and becomes visually exposed to a user of the gas strut 24. The visual detection of the dye 38 upon the rod 48 is an indication that the gas strut 24 is worn and/or has lost gas pressure, and is in need of maintenance or replacement. It is contemplated and understood that the dye may discolor the rod 48 in any variety of ways. For example, the dye 38 may generally coat the rod 48, may dry or harden upon the rod 48, and/or may cause a chemical reaction with the rod 48 causing, for example, a chemical reaction with a plating of the rod that facilitates a discoloration of the plating that is visually obvious.

As illustrated in FIG. 1, when the liftgate 22 is generally closed, the gas strut 24 is in the retracted position 28 and the base end 56 of the housing 32, along with the dye containment chamber 44, is located vertically above the working portion 44 and the piston assembly 34 contained therein. This vertical relationship assists in the utilization of gravity to promote dye flow upon the piston assembly 34 when the gas strut 24 is worn and the dye containment seal 36 is in the dye release state 72 (see FIG. 4).

In one embodiment, the dye 38 may be in liquid form and may be a vibrant color and/or fluorescent. The dye 38 may be any hydraulic, leak-detection, die including, but not limited to, Fluorescent Yellow 131SC, manufactured by the Dow Chemical Company, Midland, Mich.

Figure 5:
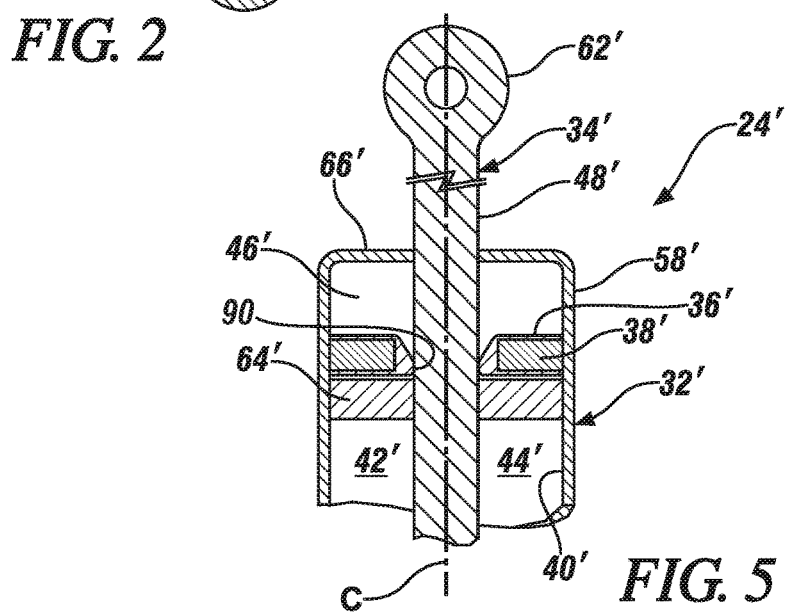
FIG. 5 is a partial cross section of a second embodiment of a gas strut.

Referring to FIG. 5, a second embodiment of a gas strut is illustrated wherein like elements to the first embodiment have like identifying numerals except with the addition of a prime symbol suffix. A gas strut 24' may include a housing 32', a piston assembly 34', a dye containment seal 36', and a dye 38'. The piston assembly 34' reciprocates along a centerline C within the housing 32'. The housing 32' includes an inner surface 40' that defines, in-part, a chamber 42', which includes a working portion 44' and a dye containment portion 46'. The dye containment portion 46' is proximate to a working end 58' of the housing 32'.

The dye containment portion 46' of the chamber 42' may have axial boundaries defined between, and by, a housing flange 66' and a rod seal 64'. The rod seal 64' may be located between the dye containment portion 46' and the working portion 44' of the chamber 42'. With this configuration, the dye containment portion 46' may not be pressurized. That is, the working portion 44' may contain a pressurized gas, and the dye containment portion 46' may generally be at atmospheric pressure.

The dye containment seal 36' may generally be a vessel adapted to hold or contain the dye 38' when the dye containment seal 36' is in a normal, unworn, state. The dye containment seal 36' is in sliding contact with a piston rod 48' of the piston assembly 34', and is constructed to wear upon the rod 48' as the rod reciprocates. When the dye containment seal or vessel 36' is sufficiently worn upon the rod 48', the dye 38' is released. That is, the seal 36' is worn to a point where an opening (not shown) is worn through a wall 90 of the seal 36' that is biased against the reciprocating rod 48'. In one example, the gas strut 24' may be designed to cycle about 25,000 times before the wall 90 of the seal 36' is generally worn away. In this example, the 25,000 cycles is associated with the life expectancy of the gas strut 24'. The strut life may be deemed expired upon, for example, a twenty percent (20%) decrease in gas pressure.

Advantages and benefits of the present disclosure may include a visual notification to the user that gas strut service may be needed.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the invention not be limited to the particular embodiments disclosed, but will include all embodiments falling within the scope of the present disclosure.

What is claimed is:

1. A gas strut comprising:
   a housing including an inner surface defining a chamber extending along a centerline, wherein the chamber includes a working portion and a dye storage portion disposed axially adjacent to, and selectively operatively isolated from, the working portion;
   a piston constructed and arranged to reciprocate within the working portion
   a dye located in the dye storage portion; and
   a dye containment seal disposed in the dye storage portion, and constructed and arranged to transfigure from a normal state to a dye release state thereby releasing the dye into the working portion.

2. The gas strut set forth in claim 1, wherein the inner surface defines a recess disposed radially outward from and in fluid communication with the working portion when the dye containment seal is in the normal state, the dye containment seal axially disposed adjacent to the working portion, the dye containment seal being in sealing contact with the inner surface, the transfigure of the dye containment seal being an axial translation from the normal state to the dye release state upon loss of internal pressure in the chamber, the recess being in fluid communication between the working portion and the dye storage portion when the dye containment seal is in the dye release state for the flow of the dye into the working portion.

3. The gas strut set forth in claim 2, wherein the piston includes a rod and a head engaged to the rod, and the dye deposits upon the rod when the dye containment seal is in the dye release state.

4. The gas strut set forth in claim 2, further comprising:
   a spring disposed in the dye storage portion, and constructed and arranged to exert an axial force upon the dye containment seal.

5. The gas strut set forth in claim 4, wherein the inner surface is cylindrical and the dye containment seal is disc-shaped.

6. The gas strut set forth in claim 3, wherein the housing includes a base end and an opposite working end through which the rod extends, and the dye storage portion is located at the base end.

7. The gas strut set forth in claim 6, wherein the piston is constructed and arranged to reciprocate in the chamber and between a retracted position with the rod being axially retracted within the housing and an extended position with the rod being axially extended out of the housing.

8. The gas strut set forth in claim 7, wherein the base end is disposed above the working end when the gas strut is in at least one of the retracted and extended positions.

9. The gas strut set forth in claim 6, wherein at least one opening communicates axially through the head for the flow of a pressurized gas as the piston reciprocates, and for the flow of the dye when the dye containment seal is in the dye release state.

10. The gas strut set forth in claim 2, wherein the recess is a circumferentially continuous groove.

11. The gas strut set forth in claim 2, wherein the recess is one of a plurality of recesses and each recess is spaced circumferentially from an adjacent recess.

12. The gas strut set forth in claim 1, wherein the dye is in liquid form.

13. The gas strut set forth in claim 12, wherein the dye is fluorescent.

14. The gas strut set forth in claim 1, wherein the gas strut is one of a gas damper, a gas spring, and a shock absorber.

15. The gas strut set forth in claim 1, wherein the piston includes a rod and a head engaged to the rod, and the dye containment seal is in sealing contact with the rod.

16. The gas strut set forth in claim 15, wherein the dye containment seal is a vessel for containing the dye when in the normal state, and is constructed and arranged to wear upon the rod and release the dye when in the dye release state.

17. A vehicle gas strut assembly comprising:
a frame;
a liftgate; and
a gas strut including a housing defining a chamber defining a working portion and a dye containment portion selectively operatively isolated from the working portion, the gas strut being pivotally engaged to one of the frame and the liftgate, a piston constructed and arranged to reciprocate within the working portion of the chamber and being pivotally engaged to the other of the frame and the liftgate, a dye disposed in the dye containment portion of the chamber, and a dye containment seal constructed and arranged to transfigure from a normal state to a dye release state indicative of strut wear.

18. The vehicle gas strut assembly set forth in claim 17, wherein the chamber is a pressure chamber and includes a recess, and wherein the recess is in fluid communication with the working portion when the dye containment seal is in a normal state and is in fluid communication with and between the working and dye containment portions when the dye containment seal is in a dye release state.

19. The vehicle gas strut assembly set forth in claim 17, wherein the dye containment seal is a vessel that contains the dye and includes a wall biased against a rod of the piston, and wherein the wall is constructed and arranged to wear-through after a pre-determined number of piston cycles thereby releasing the dye.

* * * * *